United States Patent [19]

Cykiert

[11] Patent Number: 5,444,866
[45] Date of Patent: Aug. 22, 1995

[54] DEVICE FOR SHIELDING A CELLULAR TELEPHONE USER FROM ELECTROMAGNETIC WAVES

[76] Inventor: Robert C. Cykiert, 4 Rock Meadow La., Scarsdale, N.Y. 10583

[21] Appl. No.: 21,816

[22] Filed: Feb. 24, 1993

[51] Int. Cl.$^6$ .............................................. H04B 1/38
[52] U.S. Cl. ........................................ 455/89; 455/90; 455/117; 455/128; 379/59; 379/437; 379/451; 343/702; 343/841
[58] Field of Search ............... 455/89, 90, 347, 300, 455/348, 351, 117, 128, 129, 95, 100; 379/428, 430, 433, 437, 447, 440, 61, 59, 58, 452, 451, 455, 426, 446, 449; 343/841, 702, 718

[56] References Cited

U.S. PATENT DOCUMENTS

| | | | |
|---|---|---|---|
| 5,123,044 | 6/1992 | Tate | 455/90 |
| 5,307,401 | 4/1994 | Matsuda | 455/90 |
| 5,335,366 | 8/1994 | Daniels | 455/90 |
| 5,338,896 | 8/1994 | Danforth | 455/90 |
| 5,367,309 | 11/1994 | Tashjian | 455/90 |

FOREIGN PATENT DOCUMENTS 0254630  2/1990  Japan ................................ 455/90

OTHER PUBLICATIONS

James Plante, "Cell Shield", Feb. 01, 1993, pp. 30–31.

*Primary Examiner*—Edward F. Urban
*Assistant Examiner*—Nguyen Vo
*Attorney, Agent, or Firm*—Sprung Horn Kramer & Woods

[57] ABSTRACT

A device for shielding a user from electromagnetic waves emitted by a cellular telephone. The device includes a shielding member extending between the antenna of the telephone and a user and configured to encompass the antenna on three sides.

13 Claims, 4 Drawing Sheets

5,444,866

DEVICE FOR SHIELDING A CELLULAR TELEPHONE USER FROM ELECTROMAGNETIC WAVES

BACKGROUND OF THE INVENTION

The present invention relates to a device for shielding a user from electromagnetic waves emitted by a cellular telephone.

Cellular telephones operate at frequencies in the range of 825 to 890 MHz. Recently there has been a great deal of concern over the harmful effects of electromagnetic waves emitted by a cellular phone on a user who holds the cellular phone immediately adjacent to the user's head with the antenna of the cellular telephone in the vicinity of the user's brain. While there has been no correlation between the use of cellular telephones and brain cancer, there have been a few reports of brain cancer and studies that show that radio waves of various frequencies can accelerate the development of cancers in laboratory animals. Therefore, it would be advantageous to reduce the amount of electromagnetic emissions received by a user during the use of a cellular telephone.

SUMMARY OF THE INVENTION

The main object of the present invention is to provide a device for shielding a user from electromagnetic waves emitted by a cellular telephone which is simple in construction and is easy to use.

These and other objects of the present invention are achieved in accordance with the present invention by a device according to the present invention comprising means forming an enclosure slidably receptive of a cellular telephone and a shielding member extending upwardly from the disclosure between the antenna of the telephone and a user and configured to encompass the antenna. The shield preferably surrounds the antenna on three sides. The device also includes means forming apertures in the enclosure to provide unobstructed access to a mouthpiece and an earpiece on the telephone.

In accordance with the present invention, the means forming the apertures comprises openings in the enclosure at the positions of the mouthpiece and the earpiece when the telephone is received in the enclosure and means slidably mounted on the enclosure for opening and closing the openings.

The device also advantageously comprises means forming a door at the position of a keypad when the telephone is received in the enclosure and means mounting the door for movement between an open position wherein the keypad can be accessed by a user and a closed position.

In accordance with the invention, the shielding member can be rectangular or trapezoidal in shape, or it can be circular if desired. The enclosure, shielding member and slidable members which open and close the openings comprise electromagnetic shielding material. This shielding material is a metal, such as aluminum, copper, lead, iron, steel, zinc, brass or combinations thereof and can be solid, a foil or wire mesh. The shielding material is preferably thin to make the device lightweight and has a preferable thickness from 0.001 inches to 0.250 inch. In a preferred embodiment of the present invention, the enclosure and shielding member comprise the electromagnetic shielding material as a foil sandwiched between layers of plastic.

In order to make the enclosure adaptable to different size cellular telephones, the enclosure preferably has a foam member mounted on an inside surface of a rear wall of the enclosure and foam members mounted on an inside surface at side walls of the enclosure. These foam members can be compressed to snugly mount a telephone in the enclosure without it moving around during use.

These and other features and advantages of the present invention will be seen from the following detailed description of the invention taken with the attached drawings, wherein:

DETAILED DESCRIPTION OF THE INVENTION

Figure 1:
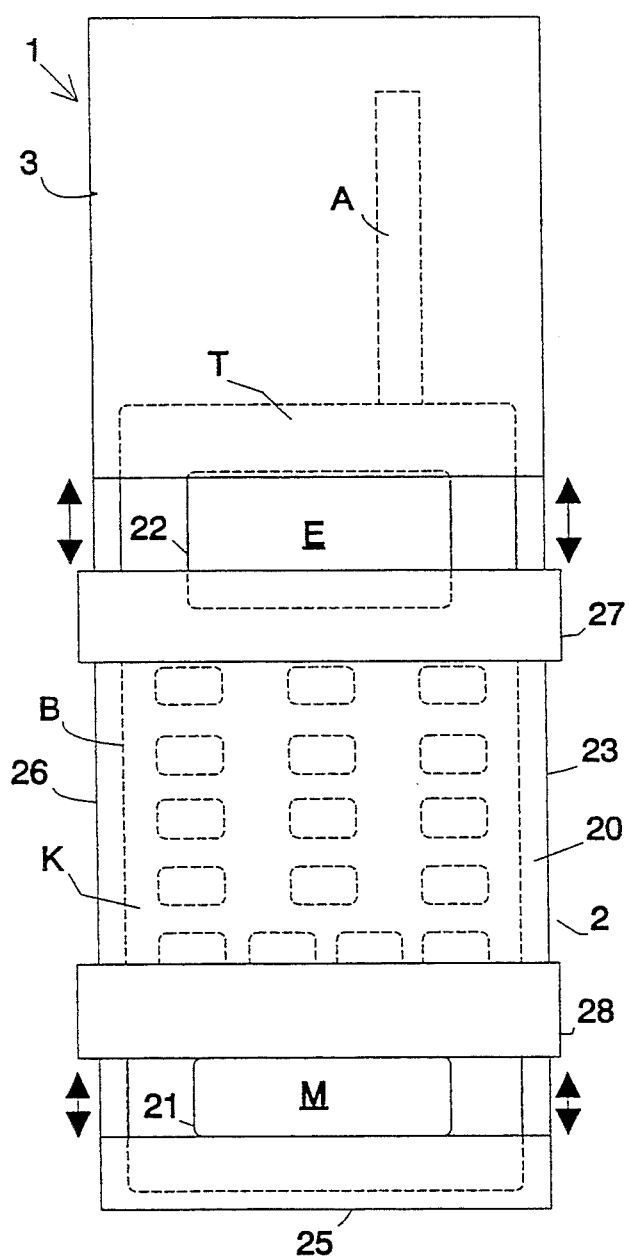
FIG. 1 is a front view of the device according to the present invention.
Figure 2:
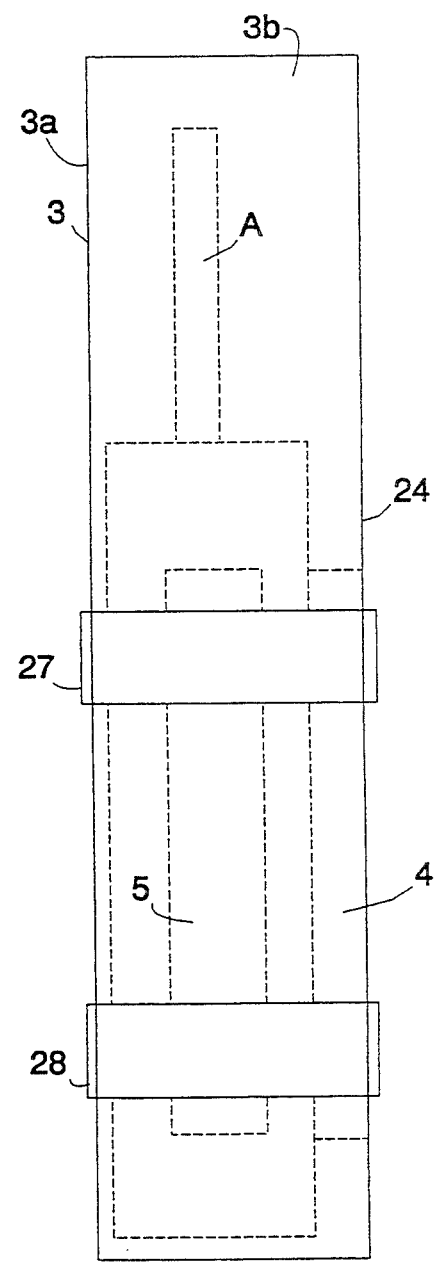
FIG. 2 is a side view of the device of FIG. 1.
Figures 3, 4:
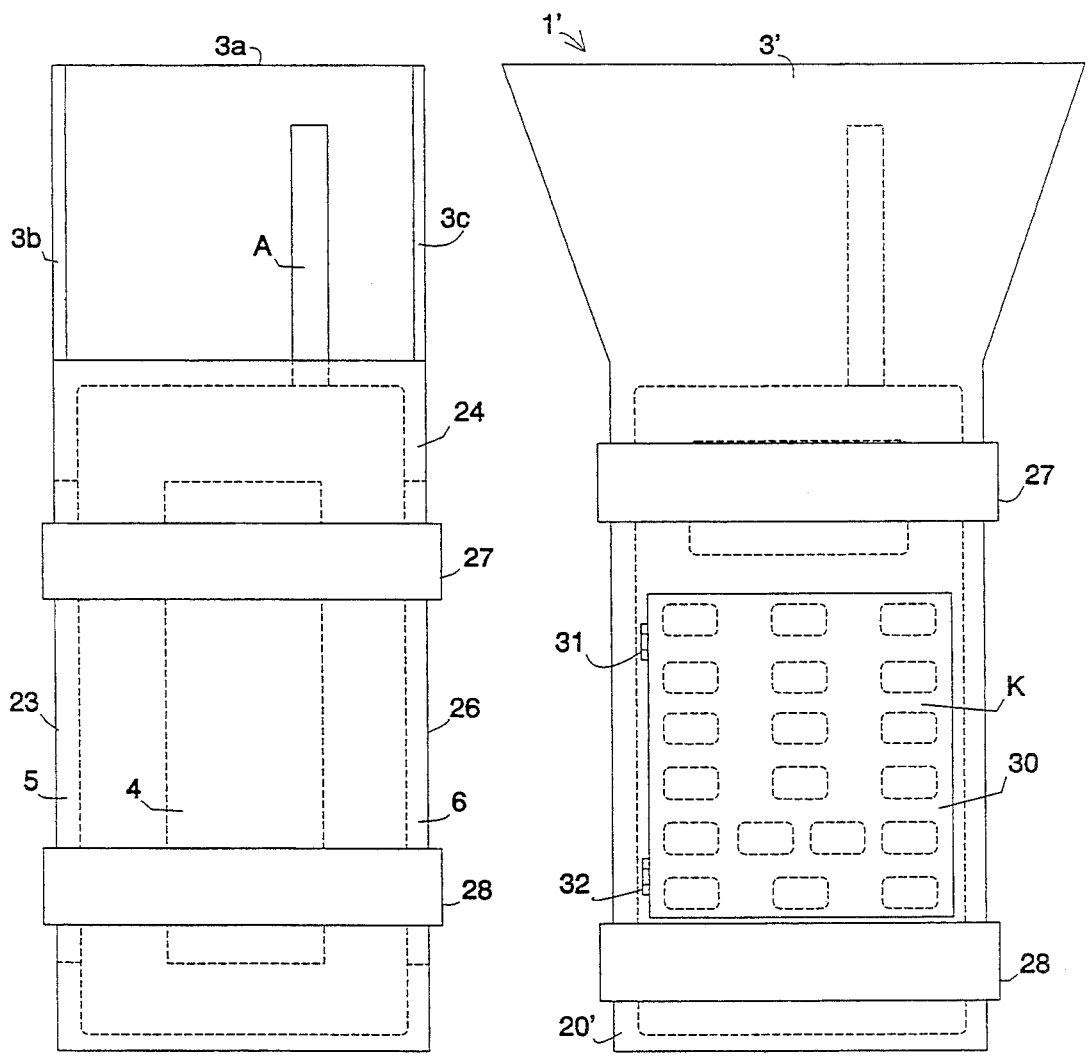
FIG. 3 is a rear view of the device of FIG. 1.
FIG. 4 is a front view of an alternative embodiment of the present invention.

Referring now to FIGS. 1–3, the device 1 according to the present invention includes an enclosure 2 having a front wall 20, side walls 23 and 26, a rear wall 24 and a bottom wall 25.

The walls form a rectangular enclosure which slidably receives a cellular telephone T therein. The telephone T includes a body portion B including a keypad K, an earpiece E and a mouthpiece M. Extending upwardly from the body portion is an antenna A.

The front wall 20 of the enclosure includes an aperture 21 positioned to be in the general vicinity of mouthpiece M and an aperture 22 positioned to be in the general vicinity of the earpiece E.

The apertures 21 and 22 are opened and closed to any desired extent by sliding members 28 and 27 respectively which are slidably mounted on the enclosure 2 for vertical movement as shown by the arrows in FIG. 1. Thus if the earpiece and mouthpiece of a telephone are in slightly different positions from that shown in FIG. 1, by moving the members 27 and 28, selective portions of the apertures 22 and 21 will be opened which are nearest to the earpiece and mouthpiece respectively.

Extending upwardly from the enclosure 2 is a shielding member 3 which is preferably integral with the front wall 20 and side walls 23, 26 of the enclosure. The shielding member 3 is configured to be disposed between the antenna A and the user when the user's ear is against earpiece E and the configuration of the shielding member 3 is such so as to encompass the antenna A as is shown in FIG. 1. The shielding member includes a front section 3a and two side sections 3b and 3c to surround the antenna on three sides.

In order to provide a good fit for different sized telephones, the interior of the enclosure 2 is provided with foam members 4–6. Foam member 4 is disposed by adhesives on the rear wall 24 and foam members 5 and 6 are disposed on side walls 23 and 26 respectively. In this way, a larger telephone will merely compress the foam members 4–6 so that the phone can be slidably received in the enclosure. The foam also helps to maintain the telephone in place and absorb shocks to the device.

The enclosure 2, shielding member 3 and slidable members 27 and 28 are preferably formed from an electromagnetic shielding material, which is a metal such as aluminum, copper, lead, iron, steel, zinc or brass. The material can be made of either solid, including a foil or a wire mesh. Particularly in the embodiment where the electromagnetic shielding material is in the form of a wire mesh or foil, the device comprises the shielding material sandwiched between layers of plastic. The shielding material preferably has a range of thickness of from 0.001 to 0.250 inches to make it lightweight.

FIG. 4 shows an alternative embodiment of the device 1' according to the present invention wherein the shielding member 3' has the shape of a trapezoid. This provides even greater shielding from electromagnetic waves.

In FIG. 4 the slidable members 27 and 28 are shown in their fully closed position and the front wall 20' of the enclosure includes a door 30 disposed in a position at the location of the keypad K of the telephone. The door 30, which is also made from the electromagnetic shielding material, is pivotally connected to the front wall 20' by hinges 31 and 32. When the slidable members are in the position shown, the door 30 can be opened so that the keypad K can be accessed by the user.

In accordance with the invention, the user in the embodiment of FIGS. 1-3 can enter the desired telephone number on the cellular telephone and, while awaiting for the call to be connected, slip it into the device 1. In the embodiment of FIG. 4, the user can first open the door 30, enter the number to be called and thereafter close the door 30 and move the slidable members 27 and 28 into a position which provides access to the earpiece and mouthpiece of the telephone.

Figures 5, 6:
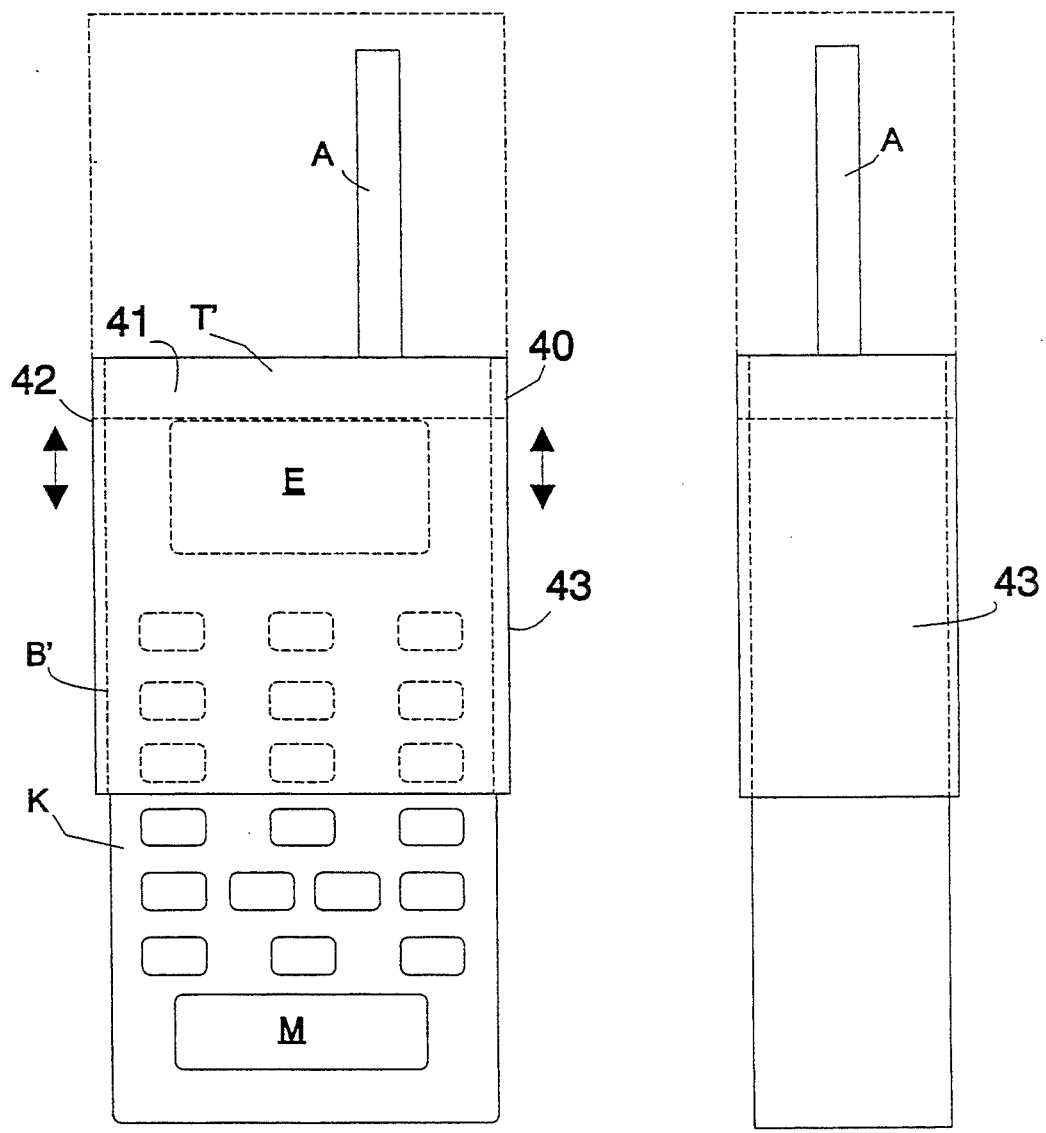
FIG. 5 is a front view of a further embodiment of the present invention.
FIG. 6 is a side view of the device of FIG. 5.
Figure 7:
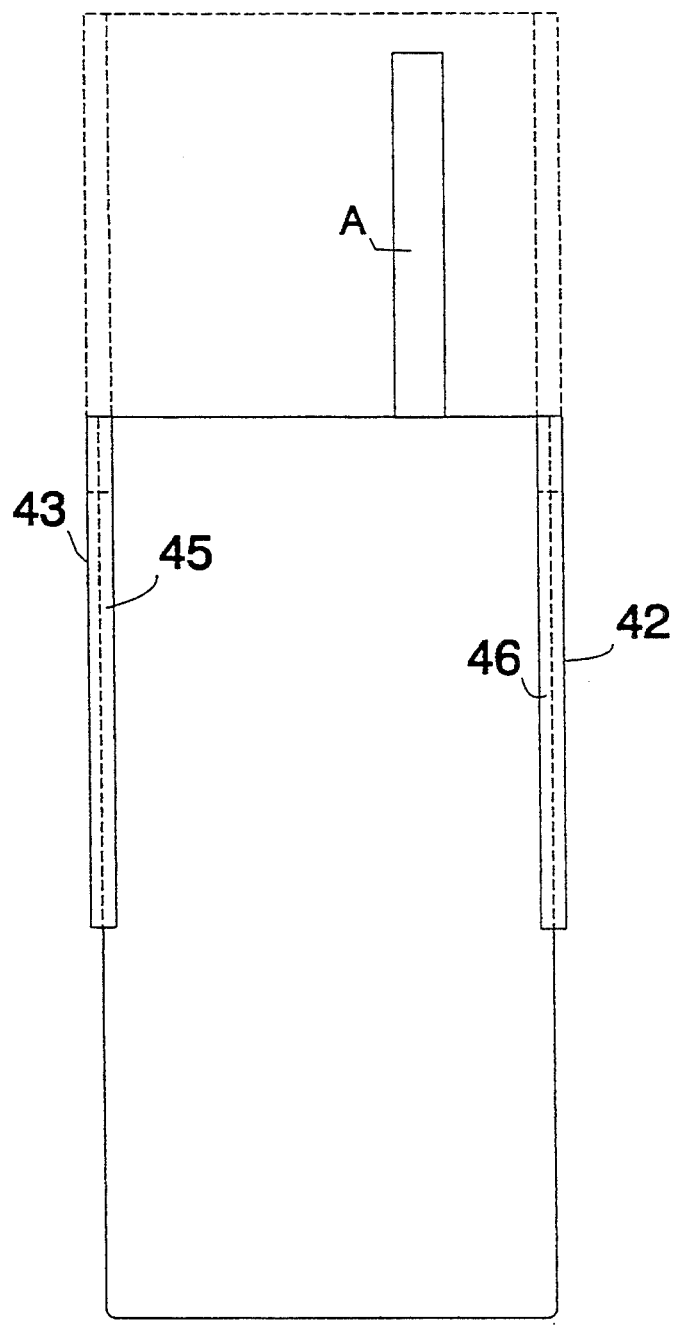
FIG. 7 is a rear view of the device of FIG. 5.

FIGS. 5-7 illustrate still another embodiment of the device according to the present invention. In this embodiment, a shielding member 40 is slidably mounted on the body B' of a telephone T'. The shielding member 40 is moveable from the non-operative position shown by solid lines in FIGS. 5-7 to the operative position shown in dotted lines in FIGS. 5-7 wherein the antenna A is surrounded on three sides and the shielding member 40 is disposed between the user and the antenna A.

The shielding member 40 includes a front wall 41 and two side walls 42 and 43. It is slidably mounted by means of flanges 45 and 46 which abut the rear of the telephone as shown in FIG. 7.

The shielding member 40 in FIGS. 5-7 can be made from the same materials as that of the previously described embodiments.

In this particularly advantageous embodiment, the earpiece E, the mouthpiece M and the keypad K are totally unobstructed when the shielding member is slid into the operative position.

It is understood that the present invention has been described hereinabove by way of example and by preferred embodiments and not as a limitation on the invention. It is to be realized that various changes, alterations, rearrangements and modifications can be made by those skilled in the art to which it relates, without departing from the spirit and the scope of the present invention.

What is claimed is:

1. A device for shielding a user from electromagnetic waves emitted by a cellular telephone including a body with a keypad, an earpiece and a mouthpiece and an antenna extending outwardly from a top portion thereof, the device comprising: an enclosure slidably receptive of the cellular telephone body to dispose the antenna to extend outwardly thereof; a shielding member extending upwardly from the enclosure between the antenna and the user and encompassing the antenna; openings in the enclosure at positions of the mouthpiece and the earpiece when the telephone is received in the enclosure to provide unobstructed access to the mouthpiece and the earpiece on the telephone; sliding members mounted on the enclosure for opening and closing the openings; and wherein the enclosure, shielding member and sliding members comprise electromagnetic shielding material.

2. The device according to claim 1, further comprising a door comprising electromagnetic shielding material disposed at a position of the keypad when the telephone is received in the enclosure and wherein the door is mounted for movement between an open position wherein the keypad is accessed by the user and a closed position.

3. The device according to claim 1, wherein the shielding member is rectangular in shape.

4. The device according to claim 1, wherein the shielding member is trapezoidal in shape.

5. The device according to claim 1, wherein the shielding member comprises a metal.

6. The device according to claim 1, wherein the enclosure and the shielding member comprise a metal sandwiched between layers of plastic.

7. The device according to claim 1, further comprising a foam member mounted on an inside surface at a rear wall of the enclosure.

8. The device according to claim 1, further comprising a foam member mounted on an inside surface at side walls of the enclosure.

9. The device according to claim 1, wherein the shielding member surrounds the antenna on three sides thereof.

10. A device for shielding a user from electromagnetic waves emitted by a cellular telephone including a body with a keypad, an earpiece and a mouthpiece and an antenna extending outwardly from a top portion thereof, the device comprising: a shielding member comprising electromagnetic shielding material; means for mounting the shielding member on the cellular telephone body for sliding movement from a non-operative position wherein the shielding member is disposed between the user and the keypad, mouthpiece and earpiece and obstructs access to the keypad, mouthpiece and earpieces to an operative position wherein the shielding member is disposed between the antenna and the user and wherein the user has unobstructed access to the keypad, the mouthpiece and the earpiece on the telephone.

11. The device according to claim 10, wherein the shielding member comprises a metal.

12. The device according to claim 10, wherein the shielding member comprises a metal sandwiched between layers of plastic.

13. The device according to claim 10, wherein the shielding member surrounds the antenna on three sides thereof.

* * * * *